United States Patent [19]

Watanabe

[11] Patent Number: 5,332,615
[45] Date of Patent: Jul. 26, 1994

[54] STRETCHED POLYETHYLENE MULTILAYER FILM

[75] Inventor: Hisazumi Watanabe, Tokyo, Japan

[73] Assignee: Idemitsu Petrochemical Co., Ltd., Tokyo, Japan

[21] Appl. No.: 861,148

[22] Filed: Mar. 31, 1992

[30] Foreign Application Priority Data

Apr. 10, 1991 [JP] Japan .................. 3-103490

[51] Int. Cl.$^5$ .................. B32B 27/32; B32B 27/08
[52] U.S. Cl. .................. 428/215; 428/518; 428/349; 428/218; 428/910; 428/34.9
[58] Field of Search .............. 428/516, 215, 218, 910, 428/349, 34.9

[56] References Cited

U.S. PATENT DOCUMENTS

| | | | |
|---|---|---|---|
| 4,356,221 | 10/1982 | Anthony et al. | 428/216 |
| 4,399,173 | 8/1983 | Anthony et al. | |
| 4,444,828 | 4/1984 | Anthony et al. | 428/218 |
| 4,551,380 | 11/1985 | Schoenberg | 428/518 |
| 4,820,557 | 4/1989 | Warren | 428/516 |
| 4,837,084 | 6/1989 | Warren | |

FOREIGN PATENT DOCUMENTS 0286430 10/1988 European Pat. Off.
0287272 10/1988 European Pat. Off.

*Primary Examiner*—P. C. Sluby
*Attorney, Agent, or Firm*—Antonelli, Terry, Stout & Kraus

[57] ABSTRACT

A stretched polyethylene multilayer film prepared by stretching a laminated film comprising a layer of an ethylene-α-olefin copolymer (A) having a melt index of 6 to 50 g/10 min and a layer of an ethylene-α-olefin copolymer (B) having a melt index of not less than 0.1 g/10 min and less than 6 g/10 min, by 2 to 7 times, both lengthwise and crosswise, has excellent low-temperature heat-sealability, excellent pin hole resistance, high mechanical strength, including excellent impact resistance, and good applicability to various processing machines, such as laminating machines, bag-making machines and automatic filling machines, and is suitable for use as packaging films and sealant materials for multilayer films.

6 Claims, 1 Drawing Sheet

STRETCHED POLYETHYLENE MULTILAYER FILM

BACKGROUND OF THE INVENTION (a) Field of the Invention

The present invention relates to stretched polyethylene multilayer films suitable for use as, for example, packaging materials and sealant materials, more particularly, to stretched polyethylene multilayer films which have excellent low-temperature heat-sealability, high mechanical strength, including excellent pin hole resistance and excellent impact resistance, and good applicability to various processing machines, such as laminating machines, bag-making machines and automatic filling machines, and can be advantageously used particularly as various kinds of packaging films and sealant materials for various kinds of multilayer films.

(b) Description of the Related Art

Typical heat-shrinkable films hitherto known are stretched films of polyvinylchloride, polypropylene or polyethylene. Among these films, polyethylene heat-shrinkable films have been put practical use as various kinds of packaging materials, including laminating materials and bag-making materials, because of their heat-sealability and inexpensive prices.

Among various kinds of polyethylenes including copolymers, linear copolymers of ethylene and α-olefins, which are called linear low-density polyethylenes (LLDPE), have attracted special interest recently.

As compared with conventional high-pressure process low density polyethylenes, the ethylene-α-olefin copolymers (LLDPE), which are linear low-density polyethylenes, can be produced with lower energy costs, and, in use as films, exhibit excellent mechanical properties, including high tear strength and high impact resistance, and are as well excellent in packaging processing properties, such as resistance to impurities during sealing and hot-tacking properties. This is the reason why LLDPEs are particularly preferred as various kinds of packaging films, and why great hopes are entertained of LLDPEs as sealant materials for multilayer films.

However, the requirement for the properties of such packaging films and sealant materials has become strict yearly, and in particular, the problems in the heat-sealability at low temperatures and in breakage of film packages and the formation of pin holes during transport cannot be solved by films of the conventional property levels. That is, films for such use require, particularly, further improvements of heat-sealability at low temperatures and of pin hole resistance, with the conventional applicability to processing machines maintained.

In order to develop films satisfying such strict requirements for properties, there have been attempted various improvements of stretched polyethylene (multilayer) films made from LLDPEs. However, there has been proposed no technique relating to stretched multilayer sealants made from LLDPEs, and heat-shrinkable films have been the mainstream of the conventional films of this kind.

For example, in Japanese Patent Application Kokai Koho (Laid-open) No. 1-301251 is disclosed a biaxially stretched heat-shrinkable multilayer film of a sandwich-type layer structure that consists of an intermediate layer of an ethylene-α-olefin copolymer (LLDPE) having a relatively high density of 0.915 to 0.930 g/cm$^3$ sandwiched between two outer layers of an ethylene-α-olefin copolymer (LLDPE) having a relatively low density of 0.870 to 0.915 g/cm$^3$. Although the heat-shrinkable film is described therein as having good applicability to packaging machines and having excellent heat-sealability at low temperatures, its heat-sealability at low temperatures particularly is still insufficient for satisfying the above-described strict requirements for the properties. The means employed for the improvement of the properties of the heat-shrinkable film, including the heat-sealability at low temperatures, are lowering of the density of the materials (the use of LLDPEs) and lamination of LLDPEs having different densities. It should be noted that the melt indexes of the LLDPEs used in the intermediate layer and both the outer layers are ranging from 0.1 to 0.3 g/10 min and from 0.2 to 0.3 g/10 min, respectively, and are low and of approximately the same degree, and that there is no description of use of LLDPEs having high melt indexes.

In Japanese Patent Application Kokai Koho (Laid-open) No. 1-304938 is disclosed a heat-shrinkable multilayer film wherein the materials of the intermediate layer and the outer layers of the film disclosed in Japanese Patent Application Kokai Koho (Laid-open) No. 1-301251 are simply exchanged with each other. The heat-shrinkable film, however, also involves the problem of insufficient heat-sealability at low temperatures. Further, the exchange of the materials between the intermediate layer and the outer layers does not make the heat-shrinkable film different from the above-described one in the points that selection of the densities of the materials is employed to improve the heat-sealability at low temperatures, that no LLDPE of high melt index is used and that the intermediate layer and the outer layers are made of LLDPEs having approximately the same degree of low melt indexes.

Further, the main object of the biaxial stretching of the multilayered films employed for the production of the above-described heat-shrinkable films is to endow the films with heat-shrinkability. Although relieving the heat-shrinkability endowed to the films by such stretching and providing non-shrinkability need a heat set by a heat-treatment near melting points, neither Japanese Patent Application Kokai Koho (Laid-open) discloses such heat set. These conventional stretched heat-shrinkable polyethylene multilayer films, therefore, are no better than heat-shrinkable films as their names impart, and involve a problem in that their uses are limited due to the inapplicability to the fields requiring non-shrinkable films.

There are other known polyethylene films, which are not multilayer films but ones heat-treated after a biaxial stretching. For example, in Japanese Patent Application Kokai Koho (Laid-open) No. 3-39332 is proposed to subject a mono-layer film of a blend of a LLDPE and a HDPE (high density polyethylene) to a sequentially biaxial stretching using a tenter method and to heat-treat the stretched mono-layer film at 80° to 110° C. The biaxially stretched resin-blend mono-layer film, however, is disadvantageous to packaging films because it requires high heat-sealing temperatures and are inferior in transparency. Further, the stretched polyethylene blend mono-layer film is shrinkable even after the heat-treatment, and the object thereof also is the use as a shrinkable film. That is, the film is also disadvantageous in that the improvement of the heat stability of the film by heat set is insufficient so that the applicable fields are limited in common with the above-described conventional heat-shrinkable films.

SUMMARY OF THE INVENTION

The object of the present invention is to solve the problems described above and to provide improved stretched polyethylene multilayer films which are excellent in the heat-sealability at low temperatures and, as well, has high mechanical strength, such as excellent pin hole resistance and high impact resistance, and good applicability to processing machines (particularly, good applicability to packaging or sealing processing, such as lamination, bag-making and automatic filling), wherefore they are advantageously applicable in many fields using films, such as the field of packaging films and the field of sealant materials for multilayer films.

The inventors have conducted research to solve the above problems and to provide stretched polyethylene multilayer films which exhibit excellent applicability to processing machines for, for example, lamination, bag-making and automatic filling, in their application to the fields of packaging films and sealant materials for multilayer films, which are particularly excellent in the heat-sealability at low temperatures, and which have high mechanical strength, such as excellent pin hole resistance and excellent impact resistance, so that these films can be advantageously used as various packaging films and sealant materials for various multilayer films.

Consequently, it has been found that the above-described object can be achieved by a stretched polyethylene multilayer film produced by laminating an ethylene-α-olefin copolymer (particularly, LLDPE) having a high melt index within a specific range and an ethylene-α-olefin copolymer (particularly, LLDPE) having a lower melt index within a specific range, by co-extrusion molding or the like, and then biaxially stretching the laminated film both lengthwise and crosswise to specific ranges of draw ratios. Further, in order to expand the fields of the application of the stretched polyethylene multilayer film to fields further including its utilization as a non-shrinkable film, the inventors conducted research to relieve its heat-shrinkability caused by the stretching, and found consequently that the object can be achieved easily by a heat-treatment at a specific range of temperatures subsequent to the stretching heretofore described. Further research of the layer structures suitable for these stretched heat-shrinkable and non-heat-shrinkable polyethylene multilayer films resulted in the finding that using a layer of the ethylene-α-olefin copolymer having a melt index within a high range as at least one outer layer is particularly effective for improving sealability, and that one having a two-layer structure consisting of one layer of the copolymer having a high melt index and one layer of the copolymer having a lower melt index, or one having a three-layer structure consisting of one intermediate layer of the latter copolymer and two outer layers of the former copolymer is particularly advantageous because of the resulting higher excellency in the sealability and simple production processes.

These findings led the inventors to complete the present invention.

That is, the present invention provides a stretched polyethylene multilayer film prepared by stretching a laminated film comprising
  at least one layer of an ethylene-α-olefin copolymer
    (A) having a melt index of not less than 6 g/10 min and not more than 50 g/10 min and
  at least one layer of an ethylene-α-olefin copolymer
    (B) having a melt index of not less than 0.1 g/10 min and less than 6 g/10 min,
by 2 to 7 times both lengthwise and crosswise.

The present invention further provides a stretched polyethylene multilayer film prepared by heat-treating the stretched polyethylene multilayer film of claim 1 at a temperature of 80° to 140° C., which is useful as a film having non-heat-shrinkability or low heat-shrinkability.

In the present invention, melt indexes are represented by the values measured in accordance with JIS K 7210.

DESCRIPTION OF THE PREFERRED EMBODIMENTS

Figure 1:
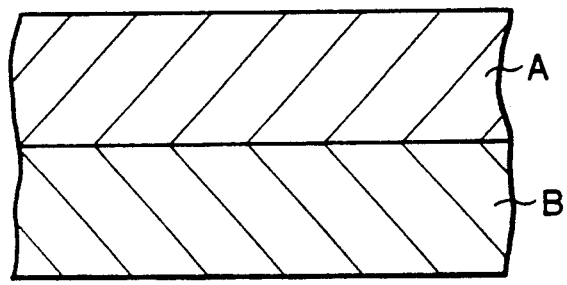
FIG. 1 is a partially sectional view of a stretched polyethylene multilayer film of an embodiment according to the present invention.

The ethylene-α-olefin copolymer (A) used as a material for forming at least one layer of the stretched polyethylene multilayer film of the present invention is an ethylene-α-olefin copolymer having a melt index (MI) ranging from 6 to 50 g/10 min, preferably from 8 to 12 g/10 min. If not the ethylene-α-olefin copolymer (A) having a melt index (MI) ranging from 6 to 50 g/10 min but rather an ethylene-α-olefin copolymer having a melt index of less than 6 g/10 min is used, a stretched multilayer film having sufficient heat-sealability at low temperatures will not be obtained, and if not the ethylene-α-olefin copolymer (A) but rather an ethylene-α-olefin copolymer having a melt index of larger than 50 g/10 min is used, the film strength or seal strength of the obtained stretched multilayer film will be decreased, and the object of the present invention cannot be achieved in either case.

Various kinds of ethylene-α-olefin copolymers may be used as the ethylene-α-olefin copolymer (A) insofar as the copolymers have the above-described range of melt indexes, and the copolymers may be used individually or as a mixture of two or more. Ethylene-α-olefin copolymers usable as the ethylene-α-olefin copolymer (A) are polyethylene copolymers obtainable by copolymerizing ethylene and one or more α-olefins other than ethylene, and generally, preferred are linear low density copolymers (LLDPE). The α-olefins used for the copolymerization with ethylene are not particularly limited, and preferred are those of 4 to 20 carbon atoms, more preferably, those of 4 to 12 carbon atoms. The α-olefins may be of various kinds, including aliphatic, alicyclic, or aromatic α-olefins, such as styrene, and generally, aliphatic α-olefins are preferable. Preferred examples of the α-olefins include butene-1, pentene-1, hexene-1, 4-methylpentene-1, heptene-1, octene-1, decene-1, undecene-1 and dodecene-1, and particularly preferred examples include butene-1, pentene-1, hexene-1, 4-methylpentene-1 and octene-1. These α-olefins to be copolymerized with ethylene may be used individually or in a combination of two or more.

The density of the ethylene-α-olefin copolymer (A) is not particularly limited, and ethylene-α-olefins suitable for the use as the copolymer (A) have a density ranging from 0.891 to 0.925 g/cm$^3$, more preferably from 0.895 to 0.920 g/cm$^3$. Ethylene-α-olefins having a density of less than 0.891 g/cm$^3$ may cause problems, such as an increase of blocking or a decrease in heat-seal strength, and those having a density of more than 0.925 g/cm$^3$ may deteriorate the heat-sealability at low temperatures or decrease the impact resistance.

The ethylene-α-olefin copolymer (B) used as a material for forming at least one layer of the stretched polyethylene multilayer film of the present invention is an ethylene-α-olefin copolymer having a melt index (MI) of at least 0.1 g/10 min and less than 6 g/10 min, preferably from 0.5 to 4 g/10 min. If not the ethylene-α-olefin copolymer (A) having a melt index (MI) of at lease 0.1 g/10 min and less than 6 g/10 min but rather an ethylene-α-olefin copolymer having a melt index of less than 0.1 g/10 min is used, the melt viscosity will be too high, thereby decreasing the formability and making efficient forming of stretched multilayer films having desired draw ratios difficult, and if not the ethylene-α-olefin copolymer (B) but rather an ethylene-α-olefin copolymer having a melt index of 6 g/10 min or more is used, the effects of stretching will be insufficient, thereby decreasing the mechanical strength of the obtained stretched multilayer films, and the object of the present invention cannot be achieved in either case.

Various kinds of ethylene-α-olefin copolymers may be used as the ethylene-α-olefin copolymer (B) insofar as the copolymers have the above-described range of melt indexes, and the copolymers may be used individually or as a mixture of two or more. Ethylene-α-olefin copolymers usable as the ethylene-α-olefin copolymer (A) are polyethylene copolymers obtainable by copolymerizing ethylene and one or more α-olefins other than ethylene, and generally, preferred are linear low density copolymers (LLDPE). The α-olefins used for the copolymerization with ethylene are not particularly limited, and preferred are those of 4 to 20 carbon atoms, more preferably, those of 4 to 12 carbon atoms. The α-olefins may be of various kinds, including aliphatic, alicyclic, or aromatic α-olefins, such as styrene, and generally, aliphatic α-olefins are preferable. Preferred examples of the α-olefins include butene-1, pentene-1, hexene-1, 4-methylpentene-1, heptene-1, octene-1, decene-1, undecene-1 and dodecene-1, and particularly preferred examples include butene-1, pentene-1, hexene-1, 4-methylpentene-1 and octene-1. These α-olefins to be copolymerized with ethylene may be used individually or in a combination of two or more.

The density of the ethylene-α-olefin copolymer (B) is not particularly limited, and ethylene-α-olefins suitable for use as the copolymer (B) have a density ranging from 0.910 to 0.960 g/cm$^3$, more preferably from 0.920 to 0.955 g/cm$^3$. Ethylene-α-olefins having a density of less than 0.910 g/cm$^3$ may cause problems, such as an. decrease of rigidity or an increase of blocking, and those having a density of more than 0.960 g/cm$^3$ may cause a decrease of impact resistance or a decrease of transparency.

The ethylene-α-olefin copolymer (A) and the ethylene-α-olefin copolymer (B) used in the present invention may be obtained easily by a medium or low pressure polymerization process wherein so called Zeigler-type catalysts, Zeigler-Natta-type catalysts or catalysts improved therefrom are used.

The stretched polyethylene multilayer film of the present invention may be produced by using one or more ethylene-α-olefin copolymers (A) having high melt indexes within the above-described specific range and one or more ethylene-α-olefin copolymers (B) having low melt indexes within the above-described specific range.

The stretched polyethylene multilayer film of the present invention is produced by using the ethylene-α-olefin copolymer (A) and the ethylene-α-olefin copolymer (B) as materials to form a laminated film comprising one or more layers of the ethylene-α-olefin copolymer (A) (hereinafter, it may be called layer A) and one or more layers of the ethylene-α-olefin copolymer (B) (hereinafter, it may be called layer B), and stretching the laminated film lengthwise by 2 to 7 times and crosswise by 2 to 7 times. Heat-treating the stretched film at 80° to 140° C. after the stretching, according to demand, provides the stretched polyethylene multilayer film of the present invention whose heat-shrinkability (particularly, heat-shrinkability at the time of heat-sealing) is extremely decreased.

The laminated film may have any layer structure of two or more layers insofar as it is a lamination product of at least one layer A and at least one layer B, and may be selected according to the layer structure of the objective product, namely the stretched film of the present invention. Also, the thickness (whole thickness) of the unstretched laminated film and the ratio of the thickness of each layer may be selected according to the thickness of the stretched film of the present invention, the ratio of the thickness of each layer and draw ratios. The layer structure of the stretched polyethylene multilayer film of the present invention, the thickness of each layer and the ratio of the thickness of each layer will be described later.

An important aspect of the present invention is the above-described stretching of the laminated film lengthwise by 2 to 7 times and crosswise by 2 to 7 times (biaxial stretching). The lengthwise draw ratio and the crosswise draw ratio may be the same or different from each other. If the lengthwise draw ratio, crosswise draw ratio or both the draw ratios are less than 2, the stretching effects will be insufficient for obtaining a film having sufficient strength, and the increased deflection of the thickness of the stretched film will make it impossible to obtain a film having a uniform thickness, and the object of the present invention won't be achieved. If the lengthwise draw ratio, crosswise draw ratio or both the draw ratios are more than 7, the too much stretching will decrease the heat-seal strength of the obtained stretched film, and the object of the present invention will not be achieved.

The method of molding the laminated film and the method of stretching the laminated film are not particularly limited, and various known molding techniques, including the above-described co-extrusion, and known stretching techniques, including known biaxial stretching techniques, may be employed. The lamination of the laminated film and the stretching of the laminated film may be carried out separately, or continuously by using apparatuses for continuous processing. Continuous methods generally are preferable for improving the productivity. Typical examples of the continuous methods are a combination of a circular-die extrusion and a tubular biaxial stretching and a combination of a T-die casting and a tenter-biaxial stretching, and any other combinations of film laminating methods and biaxial stretching methods may be employed.

Suitable resin temperature at the time of extrusion for forming the laminated film is generally 200° to 300° C., preferable 210° to 250° C.

Suitable temperature at the time of the stretching is generally 85° to 120° C., preferably 90° to 110° C. If the stretching temperature is lower than 85° C., stretching of resins may be difficult, and if it is higher then 120° C., the insufficient strength of the films being stretched may make good stretching difficult, or the properties of the obtained film, such as the strength, may be deteriorated.

The stretched polyethylene multilayer film of the present invention obtained by the stretching (biaxial stretching) within the above-described range of draw ratios is a film of high quality having heat-shrinkability, and the heat-shrinkability can be reduced sufficiently by heat-treating the stretched polyethylene multilayer film at temperatures within the above-described range. That is, heat-treating the stretched film at temperatures ranging from 80° to 140° C. provides the stretched polyethylene multilayer film of the present invention which has non-heat-shrinkability or a reduced heat-shrinkability. If the temperature of the heat-treatment is lower than 80° C., the effects of heat set may be insufficient for attaining a sufficient reduction of the heat-shrinkability in the film, and if it is higher than 140° C., problems, such as melting of the film or a decrease of the strength of the film, may occur. Preferred temperatures of the heat-treatment for reduction of heat-shrinkability is 100° to 130° C. The time of the heat-treatment depends on other conditions, including the temperature of the heat-treatment, and cannot be limited uniformly, but suitable time of the heat-treatment is generally 1 to 60 seconds, preferably 2 to 20 seconds.

Figure 2:
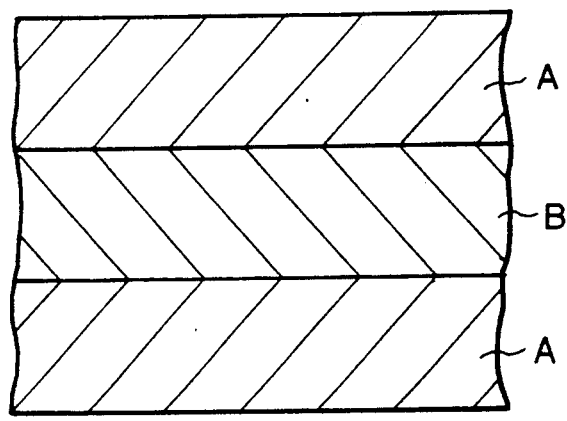
FIG. 2 is a partially sectional view of a stretched polyethylene multilayer film of another embodiment according to the present invention.

The stretched polyethylene multilayer film of the present invention, as described above, may be of various layer structures containing two or more layers, insofar as it is a laminate having at least one layer A [a layer of the ethylene-α-olefin copolymer (A)] and at least one layer B [a layer of the ethylene-α-olefin copolymer (B)]. When the stretched polyethylene multilayer film of the present invention is to be applied to a seal forming processing, a preferred stretched film is the one at least one outer layer of which is the layer A because the surface of the layer A is desirable for the use as a seal surface from the view point of its seal properties, including the heat-sealability at low temperatures and seal strength. Typical examples of the layer structures of the stretched polyethylene multilayer film of the present invention are a two-layer type wherein one layer A and one layer B are laminated as shown in FIG. 1, and a three-layer type wherein the intermediate layer is the layer B and the outer layers sandwiching the intermediate layer are the layers A. However, the layer structure is not limited to these two types, and may be of various kinds of layer structures depending on the purposes. Those of the A-B two-layer structure as shown in FIG. 1 and those of the A-B-A three-layer structure as shown in FIG. 2 are particularly suitable because using the layer A as a seal surface ensures high performance including excellent seal properties (heat-sealability at low temperatures, seal strength, etc.), and the simple layer structures simplify the production proceedings.

The thickness of the stretched polyethylene multilayer film of the present invention (the whole thickness of all the layers) and the thickness of each layer may be selected according to the purposes of use, and for the use as a packaging film or a sealant material for multilayer films, suitable whole thickness is generally 10 to 100 μm, preferably 20 to 60 μm. The ratio of the thickness of the layer A and the thickness of the layer B in the stretched polyethylene multilayer film of the present invention depends on the layer structure, the whole thickness, etc. and cannot be limited uniformly. In the case of the A-B two-layer structure as shown in FIG. 1, preferred ratio of the thicknesses (A/B) is generally from (2/98) to (98/2), preferably from (10/90) to (70/30). If the ratio of the thicknesses (A/B) is less than 2/98, the ratio of the thickness of the layer A may be too small to provide sufficient seal properties, thereby decreasing the seal strength. If A/B is larger than 98/2, the thickness of the layer B may be too small to provide sufficient film strength. In the case of the A-B-A three-layer structure as shown in FIG. 2, it is preferable to select the thickness of each layer so that the ratio of the thickness of each layer A to that of the layer B (A/B) is not less than (2/96), more preferably from (2/96) to (49/2), and the ratio of the total thickness of the two layers A [(A+A)/B] is from [4/96] to [98/2], furthermore preferably, so that the ratio of the thickness of each layer A (A/B) is not less than (3/94), more preferably (3/94) to (40/20), and the ratio of [(A+A)/B] is from [6/94] to [80/20]. The two layers A may have the same thickness or different thicknesses. If the ratio of the thickness of either layer A to the total of the layer B and the two layers A [A/(A+B+A)] is less than [2/100], the too small thickness ratio of A may decrease the seal strength on the surface of the layer A, and if the thickness ratio of the layer B to the total of the two layers A [B/(A+A)] is less than [2/98], the too small thickness ratio of B may decrease the film strength.

The stretched polyethylene multilayer film of the present invention may optionally contain, in one or more layers thereof, various additives, such as known additives common in this kind of films, according to demand, insofar as the achievement of the object of the present invention is not prevented. Examples of the additives include antioxidants, light stabilizers, anti-blocking agents, lubricants, catalyst-neutralizers, antistatic agents, antihaze agents, pigments and plasticizers.

Examples of the antioxidants include phenol antioxidants and phosphorus antioxidants.

Examples of the light stabilizers include salicylate light stabilizers, benzophenone light stabilizers and triazole light stabilizers.

Examples of the anti-blocking agents include natural or synthetic silica, silica-alumina, zeolite and diatom earth.

Examples of the lubricants include stearic acid amide, palmitic acid amide and oleic acid amide.

Examples of the catalyst-neutralizers include calcium stearate, zinc stearate and magnesium stearate.

The additives are not limited to those exemplified above, and various kinds of other additives may be added according to the purposes in the production of the material resins and films or to the purposes of use of the films.

According to demand, the stretched polyethylene multilayer film of the present invention may be subjected to after-treatments, such as surface treatments.

For example, a corona discharge treatment may be carried out to improve the surface properties, such as wetting properties for the use as a laminate sealant or for printing. It is generally preferable to carry out the corona discharge treatment, for example, under the condition of not less than 20 W/m$^3$/min, more preferably not less than 25 W/m$^3$/min, so as to increase the wetting index to 30 dyne/cm or more, preferably 35 dyne/cm or more, more preferably 38 dyne/cm or more. The corona discharge treatment may be applied to the whole or partial surface of desired surfaces of the film, and, for example, when the outer layer is the layer B, the treatment is applied to the layer B, and if both the outer layers are the layers A, to the layers A.

The thus obtained stretched polyethylene multilayer film of the present invention has a high mechanical strength and good applicability to processing machines (including the processability during lamination, bag-making and automatic filling), and is a film of high performance which excels the conventional films of this kind particularly in the heat-sealability at low temperatures, pin hole resistance and impact resistance. The stretched polyethylene multilayer film of the present invention which is not subjected to the heat-treatment (heat set), generally, exhibits good heat-shrinkability, and are suitable for the use as a heat-shrinkable film. On the other hand, the other which is subjected sufficiently to the heat-treatment (heat set) has a sufficiently reduced heat-shrinkability, and is suitable for the use as a non-heat-shrinkable film or a low heat-shrinkable film. The above-described excellent properties of the stretched polyethylene multilayer film of the present invention can be advantageously put into use in various kinds of fields using films, in particular, as a film for various packagings which include processings with packaging machines for lamination, bag-making or automatic filling, or as a sealant material for various multi-layer films.

EXAMPLES 1 TO 5 AND COMPARATIVE EXAMPLES 1 TO 4

By using two kinds of resin compositions prepared by blending the two kinds of resins as indicated in Table 1 (LLDPE-1 indicated therein is a kind of the ethylene-α-olefin copolymer (A), and LLDPE-2 is a kind of the ethylene-α-olefin copolymer (B)) with the additives as indicated in Table 1, laminated films having the layer structures as indicated in Table 2 were produced in accordance with the following method of producing films. At the time of producing the films, applications of stretching treatment and heat-treatment were done as indicated in Table 2. The LL-1 and LL-2 indicated in Table 1 represent, respectively, the resin composition containing LLDPE-1 and the resin composition containing LLDPE-2 indicated in Table 1. Measurement of melt index was conducted in accordance with JIS K 7210. As to Comparative Examples, some layers A and some layers B are different from those defined above (for example, Comparative Examples 2 to 4), but the two kinds of layers are defined as layers A and layers B for convenience.

Method of Producing Films (1) Step of producing a laminated film by co-extrusion of resins (resin compositions)

1. an extruder with a two-layer circular die (Examples 1 to 4, Comparative Examples 1 to 4)
2. an extruder with a three-layer circular die (Example 5)
3. extrusion temperature: 220° C., water temperature: 15° C.
4. ratio of layer thickness: layer A/layer B = ½
5. thickness of co-extrusion laminated film:
   450 μm (for applying stretching)
   40 μm (for Comparative Examples without stretching)

(2) Step of Stretching a Laminated Film 1. tubular biaxial stretching
2. stretching temperature: 95° C.
3. draw ratios (the ratio of stretched and unstretched in length): by 3.5 times lengthwise, by 3.5 times crosswise (3) Step of Heat-treatment 1. subjects:
   films stretched under the conditions indicated in (2); and
   unstretched films of 40 μm thick for Comparative Examples
2. heat-treatment temperature: 125° C., heat-treatment time: approximately 10 seconds All of the final films were made approximately 40 μm by selecting (1) only, (1)+(2), (1)+(3) or (1)+(2)+(3), as indicated in Table 2.

The following properties of the thus obtained multilayer films were measured and evaluated. The results are indicated in Table 2.

(1) Low Temperature Heat-seal test (seal surfaces: surface of the layer A indicated in Table 2)

1. sealing temperature (surface A): temperatures providing a peeling strength of 300 g/15 mm through a heat-sealing for one second at 2 kg/cm$^2$
2. standards for evaluating appearance observation at the time of the above-described heat-sealing a: good (almost no shrinking), b: slight shrinking, c: hard shrinking (2) Piercing Strength of film A surface of film (surface A as indicated in Table 2) was pierced at 200 mm/min with a pin of 1 mm diameter having an end curved by 2R, and the maximum strength required for piercing was measured.

(3) Film Impact Test (onto surface A indicated in Table 2)

The energy required for punching a film with a hemisphere ball of ½ inch diameter was measured.

TABLE 1

| Resin | α-olefin | Density g/cm$^3$ | MI g/10 min | Additive Kind | wt % |
|---|---|---|---|---|---|
| LLDPE-1 | C8 | 0.910 | 9 | Diatom earth | 0.8 |
|  |  |  |  | Erucic acid amide | 0.08 |
| LLDPE-2 | C8 | 0.920 | 2 | Diatom earth | 0.8 |
|  |  |  |  | Erucic acid amide | 0.08 |

LLDPE-1: MORETEC 1018CN produced by Idemitsu Petrochemical Co., Ltd.
LLDPE-2: MORETEC 0238CL produced by Idemitsu Petrochemical Co., Ltd.
Diatom earth: anti-blocking agent
Erucic acid amide: lubricant

TABLE 2

| | Layer structure | | Stretching | Heat-treatment | Sealing Temp. (°C.) | Seal appearance | Piercing strength g | Film impact kg-cm |
|---|---|---|---|---|---|---|---|---|
| | A (wt %) | B (wt %) | | | | | | |
| Examples | | | | | | | | |
| 1 | LL-1(35) | LL-2(65) | Stretched | Treated | 105 | a | 780 | 16.1 |
| 2 | LL-1(35) | LL-2(65) | Stretched | None | 104 | b | 800 | 15.5 |
| 3 | LL-1(50) | LL-2(50) | Stretched | Treated | 98 | a | 700 | 14.9 |
| 4 | LL-1(50) | LL-2(50) | Stretched | None | 98 | b | 720 | 15.0 |
| 5 | LL-1(25)/ LL-1(25 | LL-2(50)/ three layers | Stretched | Treated | 105 | a | 700 | 15.1 |
| Comparative Examples | | | | | | | | |
| 1 | LL-1(35) | LL-2(65) | None | None | 96 | a | 190 | 5.1 |
| 2 | LL-2(35) | LL-2(65) | Stretched | Treated | 140 | c | 790 | 15.6 |
| 3 | LL-2(35) | LL-2(65) | None | None | 105 | a | 200 | 5.6 |
| 4 | LL-1(35) | LL-1(65) | Stretched | Treated | 98 | b | 200 | 5.1 |

What is claimed is:

1. A stretched polyethylene multilayer film which exhibits excellent low-temperature heat-sealability and which is prepared by stretching a laminated film consisting essentially of two outer layers of an ethylene-α-olefin copolymer (A) having a melt index of not less than 6 g/10 min and not more than 50 g/10 min and one intermediate layer of an ethylene-α-olefin copolymer (B) having a melt index of not less than 0.1 g/10 min and less than 6 g/10 min, by 2 to 7 times both lengthwise and crosswise, and thereafter heat treating the stretched polyethylene multilayer film at a temperature of 80° to 140° C., wherein the ethylene-α-olefin copolymer (A) is a copolymerization product of ethylene and an α-olefin of 4 to 20 carbon atoms and has a density of 0.891 to 0.925 g/cm$^3$ and the ethylene-α-olefin copolymer (B) is a copolymerization product of ethylene and an α-olefin of 4 to 20 carbon atoms and has a density of 0.910 to 0.960 g/cm$^3$, and wherein the ratio of the thickness of each layer of the ethylene-α-olefin copolymer (A) and the thickness of the layer of the ethylene-α-olefin (B), (A/B), is not less than (2/96), the ratio of the total thickness of the layers of the ethylene-α-olefin copolymer (A) and the thickness of the layer of the ethylene-α-olefin copolymer (B), (A+A)/(B), is from 4/96 to 98/2, and the ratio of the thickness of each layer of the ethylene-α-olefin copolymer (A) and the total thickness of the layers of the ethylene-α-olefin copolymer (A) and the layer of the ethylene-α-olefin copolymer (B), A/(A+B+A), is not less than 2/100.

2. The stretched polyethylene multilayer film of claim 1, wherein the ethylene-α-olefin copolymer (A) is a copolymerization product of ethylene and an α-olefin of 4 to 12 carbon atoms, and the ethylene-α-olefin copolymer (B) is a copolymerization product of ethylene and an α-olefin of 4 to 12 carbon atoms.

3. The stretched polyethylene multilayer film of claim 2, wherein the ethylene-α-olefin copolymer (A) is a copolymerization product of ethylene and an α-olefin selected from the group consisting of butene-1, pentene-1, hexene-1, 4-methylpentene-1, heptene-1, octene-1, decene-1, undecene-1 and dodocene-1, and the ethylene-α-olefin copolymer (B) is a copolymerization product of ethylene and an α-olefin selected from the group consisting of butene-1, pentene-1, hexene-1, 4-methylpentene-1, heptene-1, octene-1, decene-1, undecene-1 and dodecene-1.

4. The stretched polyethylene multilayer film of claim 1, wherein the ethylene-α-olefin copolymer (A) has a melt index of 8 to 12 g/10 min and the ethylene-α-olefin copolymer (B) has a melt index of 0.5 to 4 g/10 min.

5. The stretched polyethylene multilayer film of claim 1, wherein the ethylene-α-olefin copolymer (A) has a density of 0.895 to 0.920 g/cm$^3$ and the ethylene-α-olefin copolymer (B) has a density of 0.920 to 0.955 g/cm$^3$.

6. The stretched polyethylene multilayer film of claim 2, wherein the ethylene-α-olefin copolymer (A) has a melt index of 8 to 12 g/10 min and a density of 0.895 to 0.920 g/cm$^3$ and the ethylene-α-olefin copolymer (B) has a melt index of 0.5 to 4 g/10 min and a density of 0.920 to 0.955 g/cm$^3$.

* * * * *